United States Patent
Gulwani et al.

(10) Patent No.: US 9,891,895 B2
(45) Date of Patent: Feb. 13, 2018

(54) USER INTERACTION MODELS FOR DISAMBIGUATION IN PROGRAMMING-BY-EXAMPLE

(71) Applicant: Microsoft Technology Licensing, LLC, Redmond, WA (US)

(72) Inventors: Sumit Gulwani, Bellevue, WA (US); Benjamin Goth Zorn, Woodinville, WA (US); Rishabh Singh, Kirkland, WA (US); Mark Marron, Redmond, WA (US); Oleksandr Polozov, Seattle, WA (US); Vu Minh Le, Kirkland, WA (US); Mikael Mayer, Issy Moulineaux (FR); Gustavo Araujo Soares, Paraiba (BR); Maxim Grechkin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 14/853,925

(22) Filed: Sep. 14, 2015

(65) Prior Publication Data
US 2017/0075661 A1    Mar. 16, 2017

(51) Int. Cl.
G06F 9/44     (2006.01)
G06F 11/36    (2006.01)

(52) U.S. Cl.
CPC ........... *G06F 8/35* (2013.01); *G06F 11/36* (2013.01)

(58) Field of Classification Search
None
See application file for complete search history.

(56) References Cited

U.S. PATENT DOCUMENTS

| 7,505,817 | B2 | 3/2009 | McDaniel et al. |
| 8,209,664 | B2* | 6/2012 | Yu .................... H04L 12/44 717/119 |
| 8,533,132 | B2 | 9/2013 | Zimmerman et al. |
| 8,799,234 | B2 | 8/2014 | Gulwani et al. |
| 8,972,930 | B2 | 3/2015 | Gulwani |

(Continued)

OTHER PUBLICATIONS

Gulwani, et al.,"NLyze: Interactive Programming by Natural Language for SpreadSheet Data Analysis and Manipulation", In Proceedings of the ACM SIGMOD international conference on Management of data, Jun. 22, 2014, 12 pages.

(Continued)

*Primary Examiner* — Chuck Kendall
(74) *Attorney, Agent, or Firm* — Workman Nydegger

(57) ABSTRACT

Systems and methods for increasing user confidence in results that are produced by one or more programs that are generated by an underlying Programming-By-Example (PBE) system based on user input examples. A plurality of generated programs that have been generated using one or more user input examples that are indicative of an output that should be achieved to comply with a user determined result are received. The generated programs are narrowed based on one or more sub-expressions of the programs that are likely to cause the resultant program to comply with the user determined result. The one or more sub-expressions are exposed. Input that selects at least one of the one or more exposed sub-expressions to thereby identify the one of the generated programs that will result in the user determined result is received.

18 Claims, 12 Drawing Sheets

(56) References Cited

U.S. PATENT DOCUMENTS

| | | |
|---|---|---|
| 9,002,758 B2 | 4/2015 | Gulwani et al. |
| 2013/0326475 A1 | 12/2013 | Gulwani et al. |
| 2013/0346982 A1 | 12/2013 | Kalai et al. |
| 2015/0095312 A1 | 4/2015 | Gulwani et al. |

OTHER PUBLICATIONS

Mayer, et al., "Game Programming by Demonstration", In Proceedings of the ACM international symposium on New ideas, new paradigms, and reflections on programming & software, Oct. 26, 2013, 16 pages.

Singh, et al.,"Predicting a Correct Program in Programming by Example", In Proceedings of 27th International Conference on Computer Aided Verification, Jun. 9, 2015, pp. 1-17.

Miller, et al.,"Multiple Selections in Smart Text Editing", In Proceedings of the 7th International Conference on Intelligent User Interfaces, Jan. 13, 2002, 12 pages.

Lau, et al., "Programming by Demonstration Using Version Space Algebra", In Journal of Machine Learning, vol. 53, Issue 1-2, Oct. 2003, pp. 1-60.

Paynter, et al.,"Applying machine learning to programming by demonstration", In Journal of Experimental & Theoretical Artificial Intelligence, vol. 16, Issue 3, Jul. 2004, pp. 616-188.

Lau, et al.,"Programming shell scripts by demonstration", In Proceedings of Supervisory Control of Learning and Adaptive Systems, vol. 4, Jul. 25, 2004, 5 pages.

Lao, Ni, et al.,"Programming by Demonstrations and Verbal Commands", In Spring LTI Colloquium Report, Retrieved on: Jun. 9, 2015, 4 pages.

Alur, et al., "Syntax-Guided Synthesis", In Proceedings of Formal Methods in Computer-Aided Design, Oct. 23, 2013, 8 pages.

Barowy, et al., "FlashRelate: Extracting Relational Data from Semi-Structured Spreadsheets Using Examples", In Proceedings of the 36th ACM SIGPLAN Conference on Programming Language Design and Implementation, Jun. 3, 2015, pp. 218-228.

Cypher, Allen, "EAGER: Programming Repetitive Tasks by Example", In Proceedings of the SIGCHI Conference on Human Factors in Computing Systems, Apr. 27, 1991, pp. 33-39.

Cypher, et al., "Watch What I Do: Programming by Demonstration", In MIT Press, May 4, 1993, 4 pages.

Feser, et al., "Synthesizing Data Structure Transformations from Input-Output Examples", In Proceedings of the 36th ACM SIGPLAN Conference on Programming Language Design and Implementation, Jun. 15, 2015, 11 pages.

Fujishima, Yuzo, "Demonstrational Automation of Text Editing Tasks Involving Multiple Focus Points and Conversions", In Proceedings of the 3rd International Conference on Intelligent user interfaces, Jan. 1, 1998, pp. 101-108.

Gulwani, Sumit, "Automating String Processing in Spreadsheets using Input-Output Examples", In Proceedings of the 38th annual ACM SIGPLAN-SIGACT symposium on Principles of Programming Languages, Jan. 26, 2011, pp. 317-329.

Gulwani, et al., "Spreadsheet Data Manipulation using Examples", In Magazine Communications of the ACM, vol. 55, Issue 8, Aug. 2012, pp. 97-105.

Gulwani, et al., "Inductive Programming Meets the Real World", In Proceedings of Communications of the ACM, Feb. 2015, 9 pages.

Jha, et al., "Oracle-guided component-based program synthesis", In Proceedings of the 32nd ACM/IEEE International Conference on Software Engineering, vol. 1, May 1, 2010, pp. 215-224.

Jourdan, et al., "A Formally-Verified C Static Analyzer", In Proceedings of the 42nd Annual ACM SIGPLAN-SIGACT Symposium on Principles of Programming Languages, Jan. 15, 2015, pp. 247-259.

Kandel, et al., "Wrangler: Interactive Visual Specification of Data Transformation Scripts", In Proceedings of the SIGCHI Conference on Human Factors in Computing Systems, May 7, 2011, pp. 3363-3372.

Landauer, et al., "Visual Awk: A, Model for Text Processing by Demonstration", In Proceedings of 11th IEEE International Symposium on Visual Languages, Sep. 5, 1995, pp. 267-274.

Lau, Tessa, "Why Programming by Demonstration Systems Fail: Lessons Learned for Usable AI", In AI Magazine, vol. 30, Issue 4, Dec. 2009, pp. 65-67.

Lau, et al., "Version Space Algebra and its Application to Programming by Demonstration", In Proceedings of the Seventeenth International Conference on Machine Learning, Jun. 29, 2000, 8 pages.

Lau, et al., "Learning Repetitive Text-Editing Procedures with SMARTedit", In Publication of Morgan Kaufmann, Mar. 1, 2001, pp. 209-226.

Le, et al., "FlashExtract: A Framework for Data Extraction by Examples", In Proceedings of ACM SIGPLAN Conference on Programming Language Design and Implementation, Jun. 9, 2014, 12 pages.

Leung, et al., "Interactive Parser Synthesis by Example", In Proceedings of the 36th ACM SIGPLAN Conference on Programming Language Design and Implementation, Jun. 13, 2015, pp. 556-574.

Lieberman, et al.,"Your Wish is My Command: Programming by Example", In Publication of Morgan Kaufmann, Mar. 12, 2001, 2 pages.

Menon, et al., "A Machine Learning Framework for Programming by Example", In Proceedings of the 30th International Conference on Machine Learning, vol. 28, Jun. 16, 2013, 9 pages.

Miller, et al., "LAPIS: Smart Editing with Text Structure", In Proceedings of Extended Abstracts on Human Factors in Computing Systems, Apr. 20, 2002, 2 pages.

Mitchell, M. Tom, "Generalization as Search", In Artificial intelligence, vol. 18, Issue 2, Mar. 1982, pp. 203-226.

Myers, Brad A., "Tourmaline: Text Formatting by Demonstration", In Publication of MIT Press, Aug. 30, 1993, 8 pages.

P. Nix, Robert, "Editing by Example", In Journal of ACM Transactions on Programming Languages and Systems, vol. 7, Issue 4, Oct. 4, 1985, pp. 600-621.

Raza, et al., "Programming by Example using Least General Generalizations", In Proceedings of the Twenty-Eighth AAAI Conference on Artificial Intelligence, Jul. 27, 2004, 8 pages.

Shen, et al., "Discovering Queries based on Example Tuples", In Proceedings of the ACM SIGMOD International Conference on Management of Data, Jun. 22, 2014, 12 pages.

Witten, et al., "TELS: Learning Text Editing Tasks from Examples", in MIT Press, Aug. 30, 1993, 1 page.

Yessenov, et al., "A Colorful Approach to Text Processing by Example", In Proceedings of the 26th Annual ACM Symposium on User Interface Software and Technology, Oct. 8, 2013, pp. 195-504.

US. Appl. No. 61/950,062, Gulwani, et al., "FlashExtract: A Framework for Data Extraction by Examples ", filed Mar. 8, 2014.

\* cited by examiner

Figure 3F

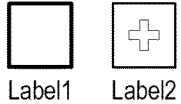

Label1  Label2

410 → [1] A. Ahmed, A.W. Appel, C.D. Richards K.N. Swadi, G. Tan, and D.C. Wang. Semantic foundations for typed assembly languages. ACM Trans. Program. Lang. Syst., 32(3), 2010.
[2] A. W. Appel. Program Logics for Certified Compliers. Cambridge University Press, 2014.
[3] A. W. Appel and S. Blazy. Separation logic for small-step Cminor. In TPHOLs, volume 4732 of LNCS, pages 5-21 Springer, 2007.

*Figure 4A*

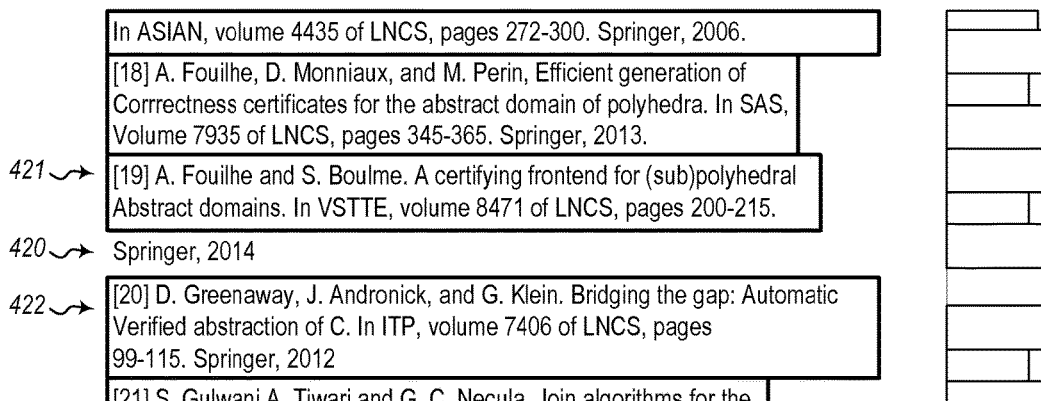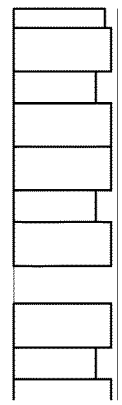

421 →  [19] A. Fouilhe and S. Boulme. A certifying frontend for (sub)polyhedral Abstract domains. In VSTTE, volume 8471 of LNCS, pages 200-215.

420 → Springer, 2014

422 → [20] D. Greenaway, J. Andronick, and G. Klein. Bridging the gap: Automatic Verified abstraction of C. In ITP, volume 7406 of LNCS, pages 99-115. Springer, 2012

*Figure 4B*

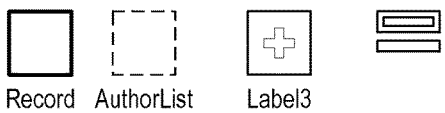

Record  AuthorList  Label3

431 → [1] A. Ahmed, A. W. Appel, C.D. Richards, K. N. Swadi, G. Tan, and D.C. Wang. Semantic foundations for typed assembly languages ACM Trans. Program Lang Syst , 32 (3), 2010

432 → [2] A. W. Appel. Program Logics for Certified Compilers. Cambridge University Press, 2014/

433 → [3] A. W. Appel and S. Blazy. Separation logic for small-step Cminor. In TPHOLs, volume 4732 of LNCS, pages 5-21. Springer, 2007.

*Figure 4C*

To extract AuthorList from Record:
From the substring starting at the first occurrence of end of WhiteSpace, extract the string ending at
▽ the ▷ first occurrence of
    ▷ end of ▷ Camel Case
    in ▷ the second line

| English | Program | close |
|---|---|---|

440 → '+4, -31 ☐ the first occurrence of Dot after Camel Case
'+8, -21 ☐ the last occurrence of Dot after Camel Case in the second
'+5, -24 ☐ the first occurrence of Dot after Dot-WhiteSpace-Camel
'+1, -22 ☐ the first occurrence of Dot after WhiteSpac-Camel Case
'+1, -22 ☐ the first occurrence of Dot after Alphnumeric-WhiteSpace

*Figure 4D*

| Output | Program viewer | Disambiguation |
|---|---|---|

'Author' is currently ambiguous. Which highlighting is correct?

451 → and / D. C. Wang    or    and / D. C. Wang ← 452

Let me edit it myself

*Figure 4E*

Record   AuthorList   Author   Label3

461 → [1] A. Ahmed, A. W. Appel, C. D. Richards, K. N. Swadi, G. Tan, and D. C. Wang. Semantic foundations for typed assembly languages ACM Trans. Program Lang Syst, 32 (3), 2010

462 → [2] A. W. Appel. Program Logics for Certified Compilers. Cambridge University Press, 2014/

*Figure 4F*

USER INTERACTION MODELS FOR DISAMBIGUATION IN PROGRAMMING-BY-EXAMPLE

BACKGROUND

Today billions of users have access to computational devices. However, a large number of these users have no programming expertise and thus may be unable to author small scripts that would automate repetitive tasks in many programs. Programming-By-Example (PBE) has the potential to help such users generate the small scripts. PBE involves techniques that generate the small scripts based on examples input by the users that specify a result the user intends. PBE can be used for many domain-specific languages.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems and methods for increasing user confidence in results that are produced by one or more programs that are generated by an underlying Program-By-Example (PBE) system based on user input examples. In one embodiment, a system includes a processor and a system memory. The system receives a plurality of generated programs that have been generated using one or more user input examples. The input examples are indicative of an output that should be achieved to comply with a user determined result. The system exposes the various sub-expressions of the generated programs. The system receives input that selects at least one of the exposed sub-expressions to thereby identify the one of the generated programs that will result in the user determined result.

In another embodiment, a first interface portion of a graphical user interface on a computing screen displays data that is to be subjected to one or more generated programs of an underlying PBE system to achieve a user intended result. The first interface portion receives one or more user input examples that cause the generation of the one or more programs that are configured to achieve the user intended result. A second interface portion of the graphical user interface displays an output that is the result of applying the one or more generated programs to the data. To enable detecting an ambiguity in the input specification, a listing of one or more programs and/or their sub-expressions is displayed in the second interface portion. The sub-expressions are configured to cause the one or more programs to at least partially comply with the user intended result. Alternatively, to enable detecting an ambiguity in the input specification, one or more questions based on the ambiguity are displayed in the second interface portion. The one or more questions are configured to resolve the ambiguity in a manner that is consistent with the user intended result. The second interface portion receives input that selects at least one of the sub-expressions to thereby identify the one of the generated programs that will result in the user determined result.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 3A-3F illustrate an embodiment of a user interface (UI) that may be implemented by the PBE computing system of FIG. 2;

FIGS. 4A-4F illustrate an example using the UI of FIGS. 3A-3B

DETAILED DESCRIPTION

Figure 1:
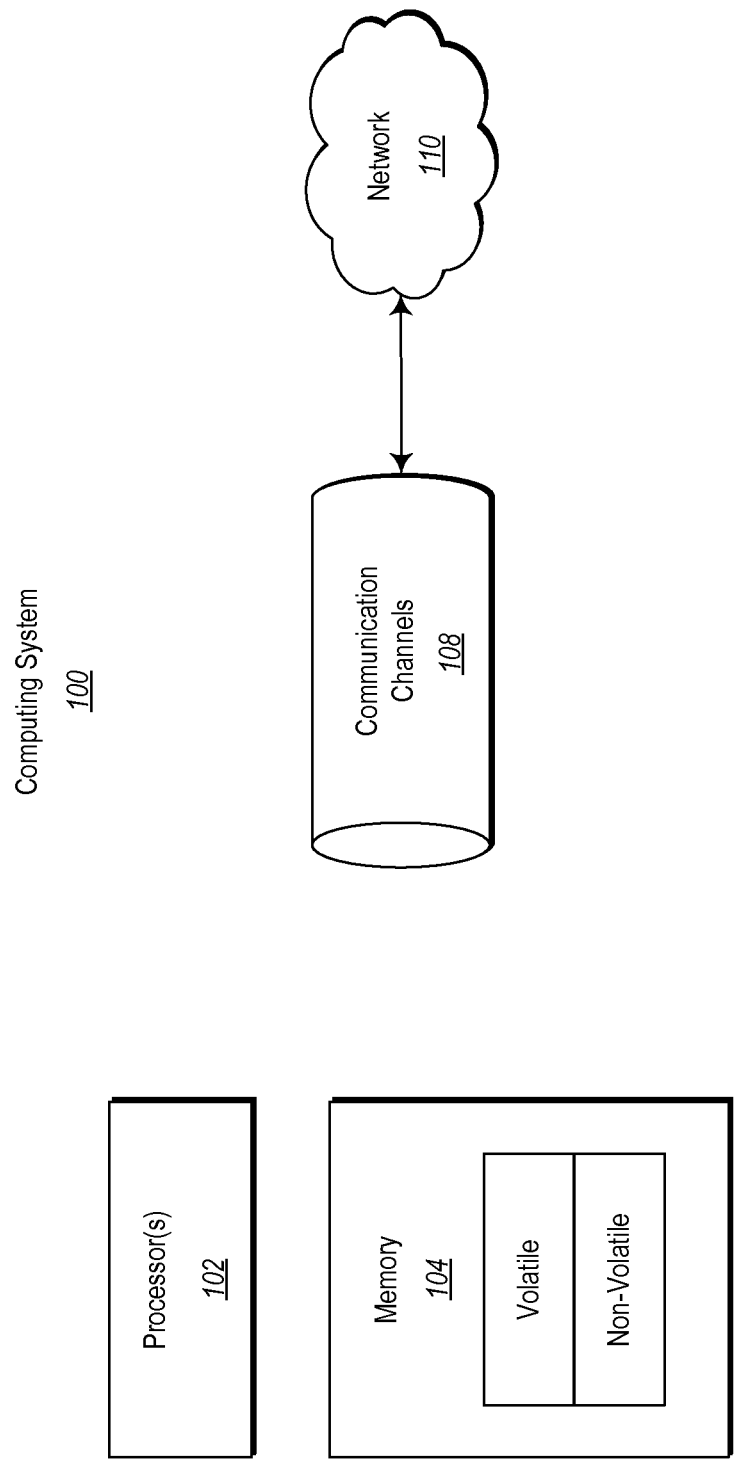
FIG. 1 illustrates a computing system in which some embodiments described herein may be employed.

Programming-By-Example (PBE) involves techniques that generate small programs and their associated sub-expressions based on examples input by users that specify a result the user intends. As will be appreciated, the number of small programs generated by PBE may be very large, leaving the user to wonder which generated program is the best to use. To solve this problem, PBE engines often will rank the generated programs to determine which one is the best for the result the user intended and provide that program to the user.

However, the underlying PBE system might end up generating a program that is consistent with the examples input by the users, but that does not actually provide the result that was intended by the users. This is because there can be programs that are consistent with the provided examples, but that differ in behavior on some other inputs. Accordingly, users may not be confident that the results of the PBE system are correct, even when they are correct, which may in turn lessen the likelihood that users will use a PBE system.

Aspects of the disclosed embodiments relate to the creation and use of PBE computing systems and user interfaces and objects that can be used to provide confidence to a user that the end result of the PBE computing system is consistent with the user's intended result.

In the present disclosure a user interface is described, which is capable of improving the user experiences associated with PBE computing systems. The user interface can be used in some embodiments to easily show the user alternative program sub-expressions (paraphrased in a natural language) that can be implemented to achieve the user's intended result, without requiring the user to understand computing languages.

There are various technical effects and benefits that can be achieved by implementing aspects of the disclosed embodiments. By way of example, the disclosed embodiments can be used to provide a more intuitive and flexible user interface for navigating through alternative program sub-expressions, which can reduce user interactions and processing associated with making desired modifications to the programs generated by the PBE computing system. The technical effects related to the disclosed embodiments can also include improved user convenience and efficiency gains through a reduction in the processing required for maintaining and managing alternative program sub-expressions.

Some introductory discussion of a computing system will be described with respect to FIG. 1. Then, the performance of a PBE computing system for increasing user confidence in results that are produced by one or more programs that are generated by the PBE system based on user input examples will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor to thereby provision the computing system for a special purpose. The memory may take any form and may depend on the nature and form of the computing system. A computing system may be distributed over a network environment and may include multiple constituent computing systems.

As illustrated in FIG. 1, in its most basic configuration, the computing system 100 includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100.

The computer-executable instructions may be used to implement and/or instantiate all of the disclosed functionality, particularly as disclosed in reference to the methods illustrated in the flow diagrams of FIGS. 9-11. The computer-executable instructions are also to implement and/or instantiate all of the interfaces disclosed herein, including the analysis view windows and graphics.

Computing system 100 may also contain communication channels 108 that allow the computing system 100 to communicate with other message processors over, for example, network 110.

Embodiments described herein may comprise or utilize special-purpose or general-purpose computer system components that include computer hardware, such as, for example, one or more processors and system memory. The system memory may be included within the overall memory 104. The system memory may also be referred to as "main memory," and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors 102 of the computing system 100 perform the acts and direct the operation of the computing system 100 in response to having executed the stored computer-executable instructions defined by the software. Various input and output devices, not illustrated, can be used by the computing system to receive user input and to display output in accordance with the computer-executable instructions.

Figure 2:
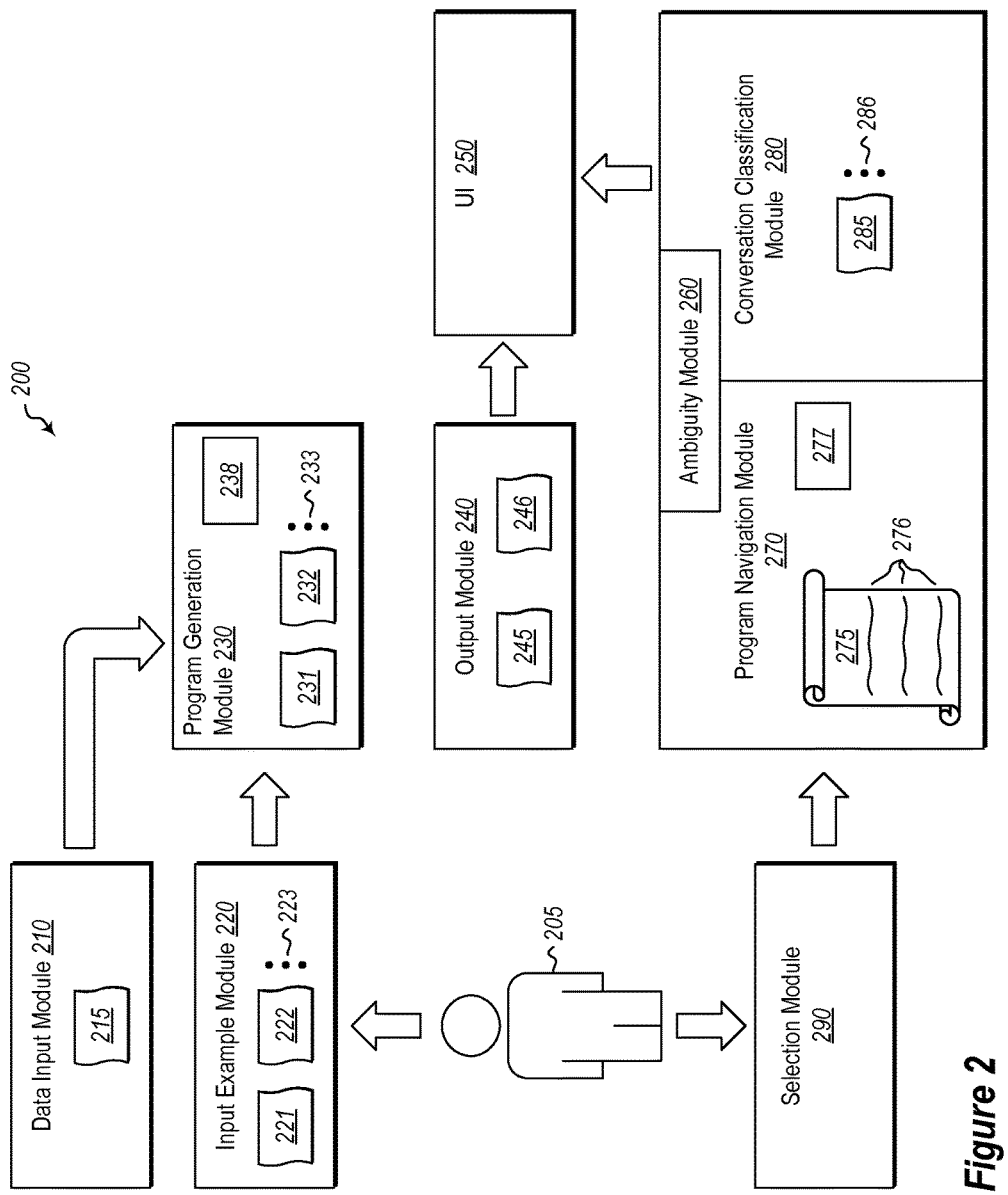
FIG. 2 illustrates an embodiment of a Programming-by-Example (PBE) computing system.

Attention is now given to FIG. 2, which illustrates an embodiment of a Programming-By-Example (PBE) computing system 200, which may correspond to the computing system 100 previously described. The PBE computing system 200 includes various modules or functional blocks that may be used to increase user confidence in results that are produced by the programs that are generated by the PBE system 200 based on user input examples as will be explained. The various modules or functional blocks of PBE computing system 200 may be implemented on a local computing system or may be implemented on a distributed computing system that includes elements resident in the cloud or that implement aspects of cloud computing. The various modules or functional blocks of PBE computing system 200 may be implemented as software, hardware, or a combination of software and hardware. The PBE computing system 200 may include more or less than the modules illustrated in FIG. 2 and some of the modules may be combined as circumstances warrant. Although not illustrated, the various modules of the PBE computing system 200 may access and/or utilize a processor and memory, such as processor 102 and memory 104, as needed to perform their various functions.

As illustrated in FIG. 2, the PBE computing system 200 includes a data input module 210. In operation, the data input module 210 receives data 215 that is to be subjected to one or more programs that are generated by the computing system 200 based on user input examples as will be explained in more detail to follow. The data 215 may be any type of data that is able to be subjected to the generated programs. In one embodiment, the data 215 may be semi-structured data such as semi-structured textual data or log files. In other embodiments, the data 215 need not be textual. The data 215 may also include spreadsheets or webpages. The data 215 may be received from any reasonable source as circumstances warrant.

The PBE computing system 200 also includes a user input example module 220. In operation, the user input example module 220 receives various user input examples 221, 222, and potentially any number of additional user input examples as illustrated by the ellipses 223 from a user 205. The user input examples 221, 222, and 223 are examples that specify or identify an intended or determined result that the user 205 would like a generated program to achieve when implemented.

For example, in one embodiment the user input examples 221, 222, or 223 may specify that the user 205 would like the generated program to extract the set of individual authors from the Bibliography section of a paper. In another embodiment, the input examples 221, 222, or 223 may specify that the user 205 would like the generated program to extract a set of Super Bowl champions from a semi-structured text listing of various Super Bowl data. In some embodiments, the user input examples 221, 222, or 223 may be input by having the user 205 highlight or otherwise identify in a user interface the desired information to be extracted from the semi-structured data, such as the list of authors or the list of Super Bowl champions. In other embodiments, the user input examples 221, 222, or 223 may be input in other reasonable way. Accordingly, the embodiments disclosed herein are limited by the type of the user input examples 221, 222, or 223 or how the input examples are input into the user example input module 220. It will be appreciated that although the user 205 will typically be a human user, the user 205 may also include non-human computing systems, artificial intelligence and the like.

The PBE computing system 200 further includes a program generation module 230. As illustrated, the program generation module 230 receives one or more of the user input examples 221, 222, and 223. Based on the one or more user input examples 221, 222, and 223, the program generation module 230 may generate a generated program 231, a generated program 232, and potentially any number of additional generated programs as illustrated by the ellipses 233 that are each designed to achieve the user intended or determined result as specified in the user input examples. It will be appreciated that generating the various generated programs also generates any sub-expressions that are included in the generated program. In many embodiments, the generated programs 231, 232, and 233 share a number of sub-expressions.

In many embodiments the number of additional generated programs 233 may be very large, perhaps in the tens of thousands. Accordingly, the program generation module 230 may include a rank engine 238 that is able to rank the generated programs to determine the program that is believed to be the most likely to result in the user intended or determined result.

In one instance, the program generation module 230 may generate $10^{30}$ ambiguous programs that are consistent with the user input examples. The program generation module 230 implements a polynomial-space representation of the program set know as version space algebra (VSA).

The key idea of VSA is sharing of subspaces. For example, an operator SubStr (s, $p_1$, $p_2$), which extracts a substring of s that starts at the position $p_1$ and ends at the position $p_2$. Here $p_1$ and $p_2$ can expand to various position logics, e.g. absolute ("$5^{th}$ character from the right") or based on regular expressions ("after the second number"). On a given example, $p_1$ and $p_2$ are known to evaluate to 1 and 4, respectively (i.e., the result of SubStr (s, $p_1$, $p_2$) is the string s[1:4]). Importantly, both $p_1$ and $p_2$ may satisfy the specification in multiple possible ways. For example, $p_1$ can expand to a program "$1^{st}$ character from the left" or a program "$(|s|-1)^{th}$ character for the right" or any consistent regex-based program (based on the content of s in a given example).

Thus the total number of possible consistent SubStr (s, $p_1$, $p_2$) programs is quadratic in the number of possible consistent position programs (since any consistent $p_1$ can be combined with any consistent $p_2$). However, VSA stores these programs concisely as a join structure over the two program sets with learned consistent program sets for $p_1$ and $p_2$. Such a structure consists of the two learned program sets for $p_1$ and $p_2$ and a "join tag", which specifies that any combination of the programs sampled from these two sets is a valid combination of parameters for the SubStr operator. Therefore the overall size of the VSA is typically logarithmic in the number of programs it semantically represents.

The program generation module 230 represents program sets as a combination of shared program sets using two operators union and join. A union of two VSAs $\tilde{N}_1$ and $\tilde{N}_2$ represents a set that is a union of two sets represented by $\tilde{N}_1$ and $\tilde{N}_2$. A join of two VSAs $\tilde{N}_1$ and $\tilde{N}_2$ represents a set that is a Cartesian product of two sets represented by $\tilde{N}_1$ and $\tilde{N}_2$. Such a representation has at least the following two benefits: (a) it stores an exponential number of candidate programs, using only polynomial space and (b) it allows exploring the shared parts of the space of candidates and quickly examine the alternative candidate subexpressions.

Returning to FIG. 2, it is illustrated that the program generation module 230 also receives the data 215 from the data input module 210. The program generation module 230 applies one or more of the generated programs 231, 232, and 233 to the data 215. In those embodiments where the rank engine 238 ranks the generated programs, the program generation module 230 may apply the one of the generated programs that is ranked most likely to achieve the user identified or determined result.

In any case, applying one or more of the generated programs to the data 215 results in an output 245, which is displayed or otherwise output by an output module 240. In one embodiment, the output module may include or implement a user interface (UI) 250 that displays the output 245 on a computing screen or other display of the PBE computing system 200. Example embodiments of the UI 250 will be explained in more detail to follow.

Although the generated programs 231, 232, and 233 are generated to comply with the user intended or determined result as specified by the user input examples 221, 222, and 223, the generated programs may differ in their behavior on some other inputs. In other words, the program generation module 230 may generate an unintended program that is consistent with the user input examples 221, 222, and 223, but that nevertheless does not output the user intended result on some other input the user 205 cares about. Accordingly, the PBE computing system 200 may also include an ambiguity module 260 that in operation corrects for any ambiguities that may be present in the generated programs 231, 232, and 233 so that the output 245 is consistent with the user intended or determined result. In some embodiments, the ambiguity module 260 narrows the generated programs 231, 232, and 232 based on one or more subexpressions of the programs that are likely to cause the generated program to comply with the user intended or determined result.

As illustrated, the ambiguity module 260 includes a program navigation module 270 and a conversational clarification module 280. The program navigation module 270 exposes the subexpressions of the generated programs by generating a list 275 of sub-expressions 276 of the generated programs. The program navigation module 270 leverages the fact that most of the generated programs that are likely to output the user intended or determined result share common sub-expressions. The list 275 may be displayed to the user 205 in the user interface 250 or in some other way. In some embodiments, the sub-expressions 276 of the list 275 include an indication of how the output 245 will be changed if a given sub-expression 276 of the list 275 is selected. For example, the indication may indicate a number of the output fields that will be changed if the given sub-expression 276 is selected.

The program navigation module 270 also includes a description module 277 that in operation provides at least a partial description for the sub-expressions 276 of the list 275. The description provides a way for the user 205 to understand what output each sub-expression 276 should cause to happen if selected.

In one embodiment, the description module 277 generates a partial description of the sub-expressions 276 in a language that is understandable by the user 205. This language may be the spoken language of the user 205 such as English. Accordingly, the user 205 is able to read the partial description and gain at least a partial understanding of the function of each of the listed sub-expressions 276. Using the spoken language description may be most useful to those users 205 who do not understand computing languages, although the spoken language may also be helpful to user 205 who do understand computing languages as it may be easier to understand.

In other embodiments, in addition to the spoken language description or as an alternative, the description module 277 may provide a description of the sub-expressions 276 by showing at least a portion of the underlying computing language code of the sub-expressions 276. Using the computing language description may be useful to those users 205 who understand computing languages and may allow them to determine what changes to the sub-expression code need to be made so that the generated programs output the user intended result.

In embodiments that implement the UI 250, the description module 277 may show the effect that selecting a given sub-expression 276 will have on the output 245. As will be explained in more detail to follow, selecting a given sub-expression 276 may cause portions of the output 245 to be highlighted, hatched out, or any other way that may show the effect of the sub-expression.

In further embodiments, the description module 277 may specify by way of ordering using a ranking function which of the sub-expressions 276 of the list 275 is the most likely to cause the generated program to output the user intended or determined result. In this way, the user 205 may be informed which sub-expression 276 to select. Of course, in such embodiments, the user 205 would still be able to select one or more other sub-expressions 276 in addition to or alternatively to the specified sub-expression as circumstances warrant.

By allowing the user to select the one or more sub-expressions 276 that will cause the generated program to output, or at least output in the closest way possible, the user intended or determined result, the PBE computing system 200 is able to identify the generated programs 231, 232, or 233 that will output the user intended or determined result. Accordingly, the PBE system 200 includes a selection module 290.

In the embodiments implementing the program navigation module 270 that generates the list 275, the selection module 290 receives input from the user 205 to select one or more of the sub-expressions 276. The input from the user 205 may be, but is not limited to, an interface pointer or the like that selects the sub-expression 276, highlighting the selected sub-expression 276, hovering over the selected sub-expression 276, or clicking on the sub-expression 276. It will be appreciated that the input received by the selection module 290 from the user 205 may be any reasonable input that is able to select one or more of the sub-expressions 276.

Upon selection of the one or more sub-expressions 276, the program generation module 230 updates at least one of the generated programs 231, 232, or 233 to include the one or more selected sub-expressions. The updated generated programs should then be structured to more fully output the user intended or determined result. The updated one or more generated programs may then be applied to the data 215 to generate an updated output 246 using the output module 240 that may be displayed in the user interface 250 or displayed in some other manner.

As previously mentioned, the ambiguity module 260 may also include the conversational clarification module 280. In operation, the conversational clarification module 280 exposes the choices by asking the user 250 one or more specific questions that are designed to resolve ambiguities with respect to the data 215. Accordingly, the conversational clarification module 280 generates a question 285 and potentially additional question as illustrated by the ellipses 286. The user 205 is then asked the question 285 (or questions 286) and provides answers that are input by the user 205 via the selection module 290.

For example, in one embodiment any cluster of generated programs 231, 232, or 233 that have an output different from the output 245 is a possible source of an ambiguity. The topmost program that produces the different output is a clarification candidate.

The questions 285 is based on the generated program 231, 232, or 233 that produces the output 245, designated as program P, and the classification candidate, designated as program P'. A discrepancy between the two can have three possible manifestations:

The outputs of P and P' match until P selects a region r which does not intersect any selection of P'. This leads to the question "should r be highlighted or not?"

The outputs of P and P' match until P' selects a region r' which does not intersect any selection of P. This leads to the question "should r' be highlighted or not?"

The outputs of P and P' match until P selects a region r, P selects a region r', and r intersects r'. This leads to the question "should r or r' be highlighted?"

In the embodiment, for faster convergence the three types of questions are merged into one and the question 285 asks a question of the type "what should be highlighted: $r_1$, $r_2$, or nothing?" When the user 205 selects $r_1$ or $r_2$, this marks the selected region as a positive example. When the user 205 selects "nothing", this marks $r_1$ and $r_2$ as negative examples.

The program generation module 230 converts the answers into a new user input example and then updates the generated programs 231, 232, or 233 to be consistent with the new input examples. This process may be iteratively repeated as needed to identify the generated program 231, 232, or 233 that output the user identified or determined result. In other words, the conversational clarification module 280 may continue to generate the question 285 (or questions 286) each time the ambiguity is determined until the generated program 231, 232, or 233 that outputs the user identified or determined result is found. This iterative process should cause the pool of candidate generated programs that can be the generated program that outputs the user identified or determined result to be smaller with each iteration. The updated output 246 may then be displayed in the UI 250 as previously described.

As previously discussed, the PBE computing system 200 may include or may be implemented as a user interface such as UI 250. FIGS. 3A-3F illustrate a UI 300 that may correspond to the UI 250. It will be appreciated that the UI 300 may include additional user interface elements than those illustrated in FIGS. 3A-3F and discussed herein. Accordingly, the exact number of user interface elements is not limiting to the embodiments disclosed herein.

As illustrated, the UI 300 includes a first interface portion 310 and a second interface portion 320. The first interface portion 310 may receive data, such as data 215, that is to be subjected to the one or more generated programs of the PBE computing system 200. The first interface portion also receives the one or more user input examples 221, 222, and 223. Further, the first interface portion 310 may show the effects of subjecting or applying the one or more generated programs to the data and the effects of selecting a given sub-expression 276.

The second interface portion 320 allows the user 205 to interact with the PBE computing system 200 through the use of tabs 321, 322, and 323. The output tab 321 displays in the second interface portion the output of applying the generated programs to the data shown in the first interface portion. The program viewer tab 322 displays in the second user interface portion the generated programs and allows the user to select one or more sub-expressions of the generated programs as needed. The disambiguation tab 323 displays in the second interface portion the question 285 and allows the user to input answers to the question.

Figure 3A:
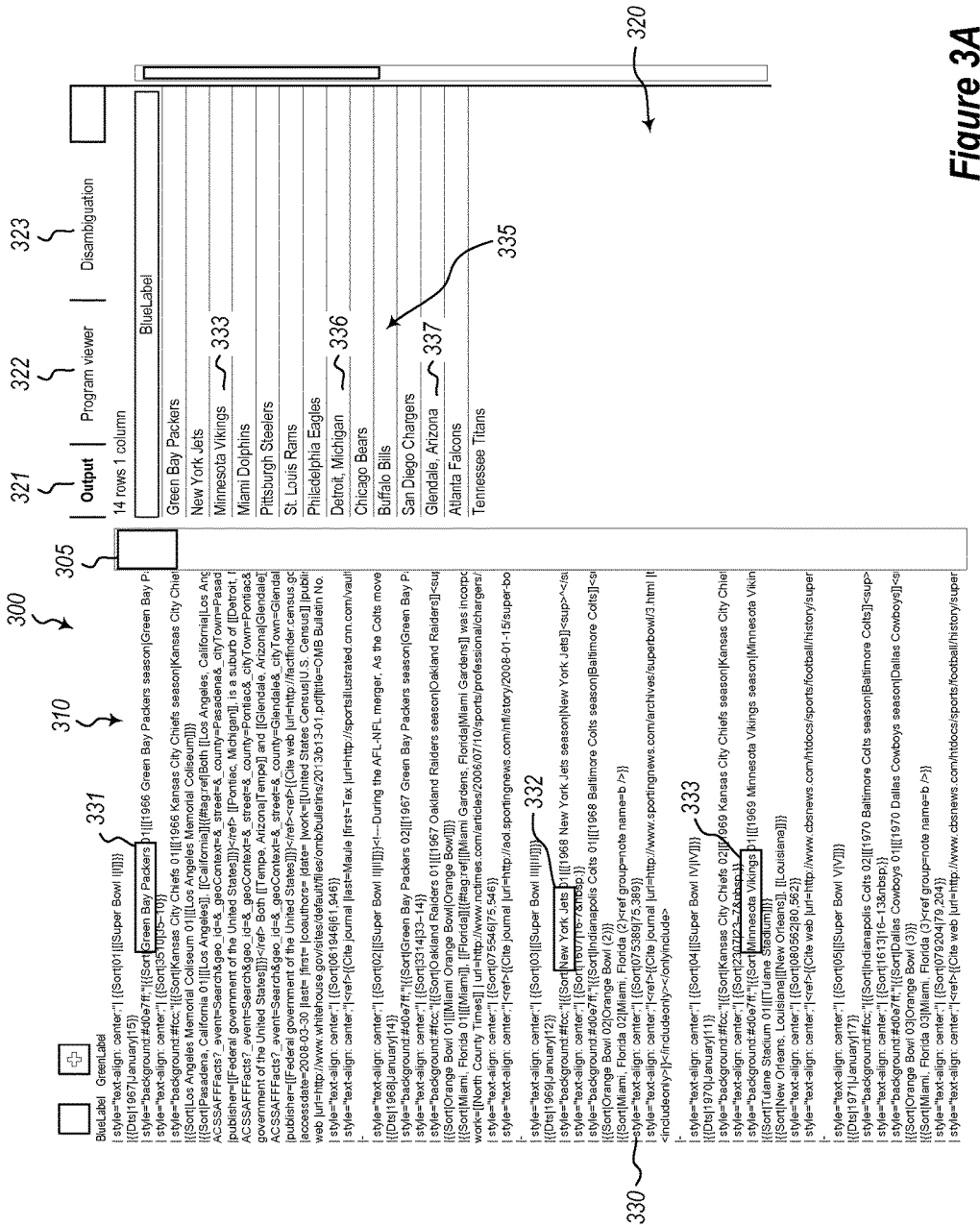

As illustrated in FIG. 3A, the first interface portion 310 displays data 330 that comprises semi-structured textual data that includes information about all 49 Super Bowls including the winning team, the losing team, and the location of the game. It will be appreciated that the views shown in FIGS. 3A-3F are only partial views of the UI 300 that do not include all the information that may be shown in the first interface portion 310 and the second interface portion 320. In other words, the UI 300 may include sliders such as slider 305 that change what is visible in the first and second interface portions to the user 205.

If the user 205 desires to extract from the data 330 a list of the winning teams, the user may highlight examples of the winning team as a user input example to show the PBE computing system the user intended or determined result. In FIG. 3A, the user may highlight the Green Bay Packers, the winners of the first Super Bowl as indicated by 331 and may highlight the New York Jets, winners of the third Super Bowl as indicated by 332. The PBE system 200 generates one or more programs that are designed to extract the winning team and applies this to the data 330. The output of the highest ranked generated program is then displayed as output 335 in the second interface portion. The system also highlights what should be the other winning teams as indicated at 333 by the highlighting of the Minnesota Vikings.

A review of the output 335 and/or a review of the highlighted portions of the data 330 reveals extracted data that is not consistent with the user intended or determined result. For example, as mentioned the Minnesota Vikings have been highlighted. However, the Minnesota Vikings were the losing team in Super Bowl IV while the Kansas City Chiefs were the winning team. In addition, the output 335 has only listed 14 entries and not the expected 49 winners of the 49 Super Bowl and some of the entries include teams that did not win the Super Bowl (e.g., the Minnesota Vikings). Further, some of the 14 listed entries are not football teams, but are the host cites of a given Super Bowl, for example Detroit, Mich. 336 and Glendale, Ariz. 337.

Figure 3B:
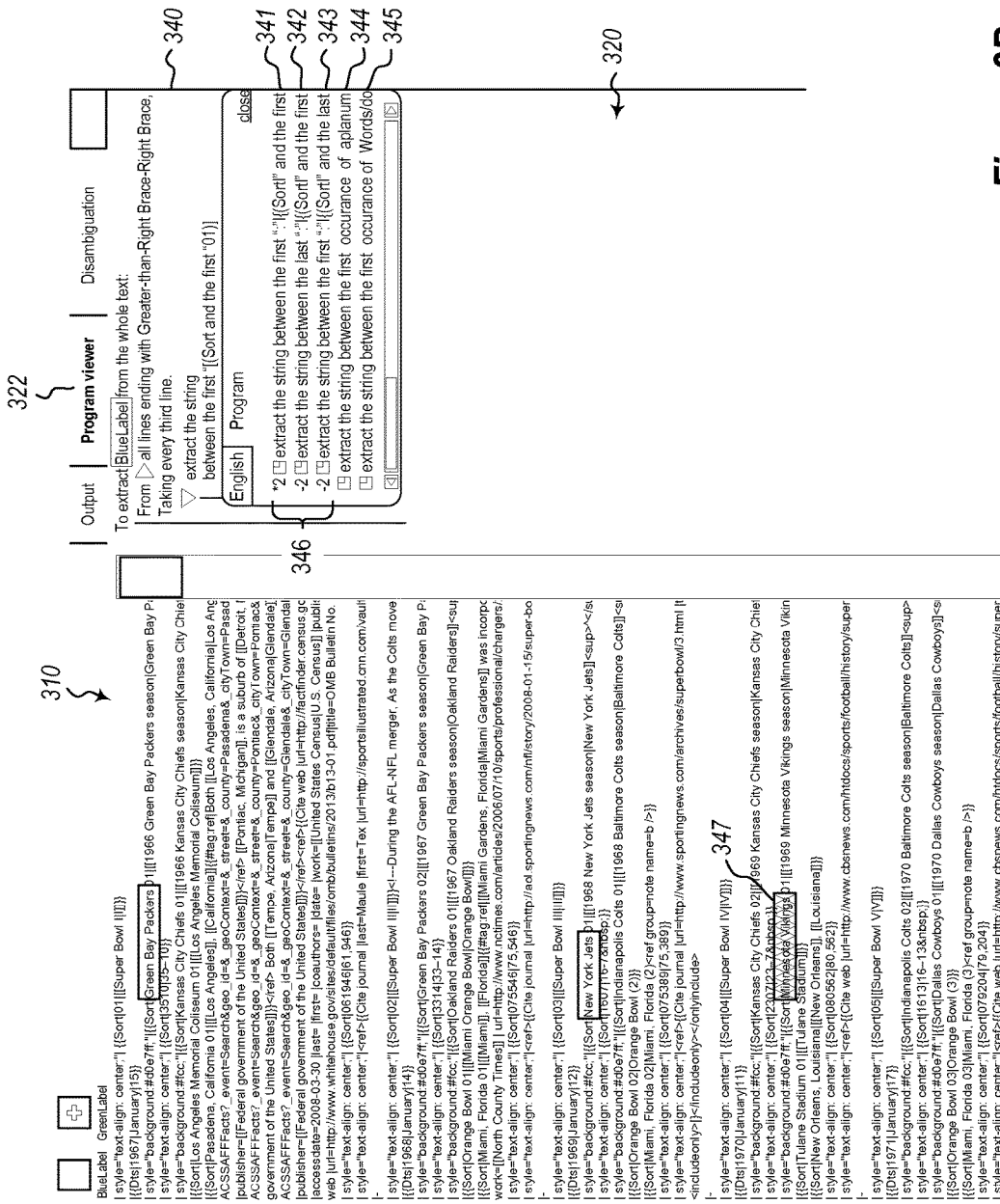

As shown in FIG. 3B, the program viewer 322 displays in the second interface portion 320 a listing of a program 340 which may correspond to the generated programs 321, 322, or 323. In addition, various sub-expressions 341-345 that are likely to cause the program 340 to achieve the user intended or determined result are also listed. The sub-expressions 341-345 are at least partially described in English, which is a language that is readable and understandable by the user 205. Of course, other spoken languages may also be used as previously described for non-English speaking users.

As illustrated, the sub-expressions 341-343 include an indicator 346 that indicates how the data 330 will be effected if that sub-expression is selected. For example, the indicator 346 of the sub-expressions 341-343 is a −2, which means that if that sub-expression is selected then two less entries in the data 230 will be selected.

In some embodiments, the user 205 may hover over one of the sub-expressions 341-345. In response, a visual or graphical representation of the effect of selecting that sub-expression will be shown in data 230 shown in the first interface portion. For example, as illustrated in FIG. 3B the Minnesota Vikings are shown as being hatched out, which illustrates that if a given sub-expression is selected then the Minnesota Vikings will be removed from the output.

Figure 3C:
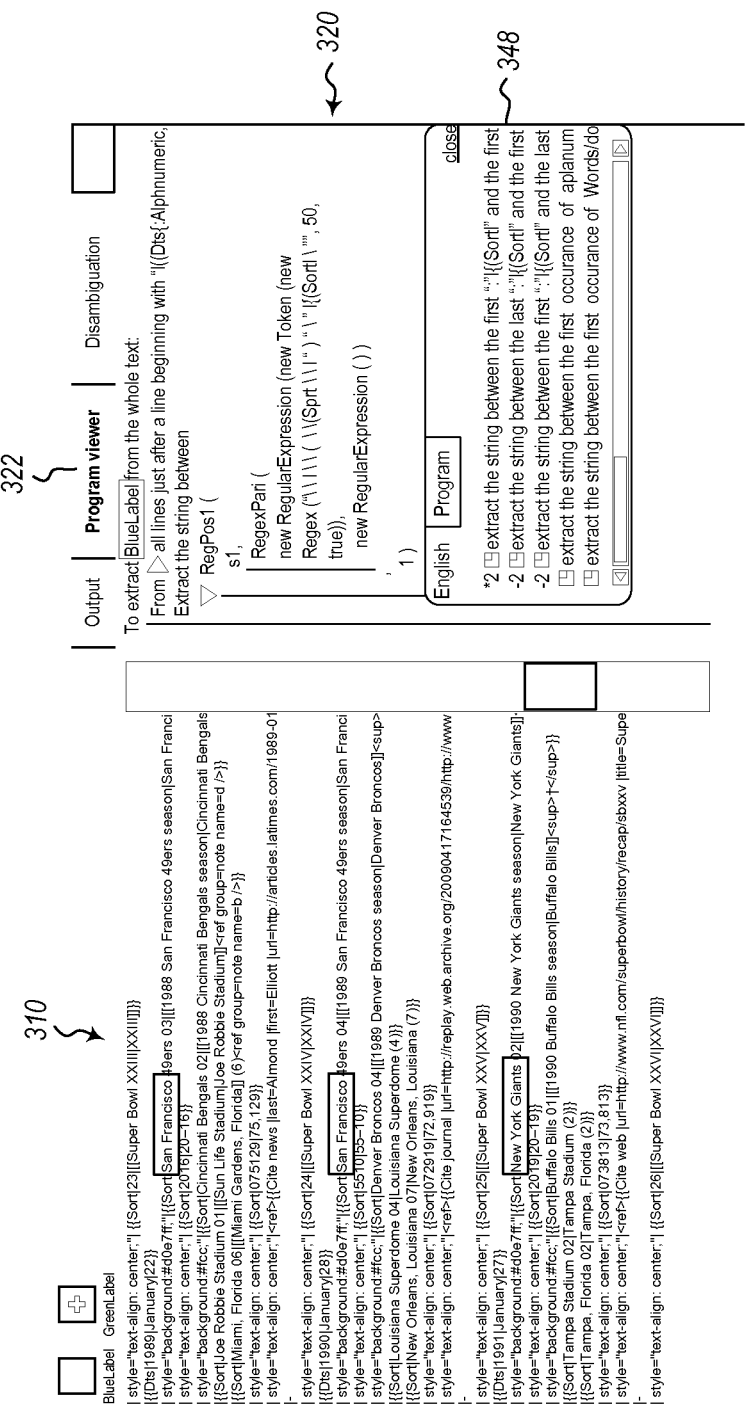

FIG. 3C illustrates an alternative description for the listed sub-expressions. As shown at 348 and as discussed previously, the sub-expressions may also be described or listed using their computing language code.

Figure 3D:
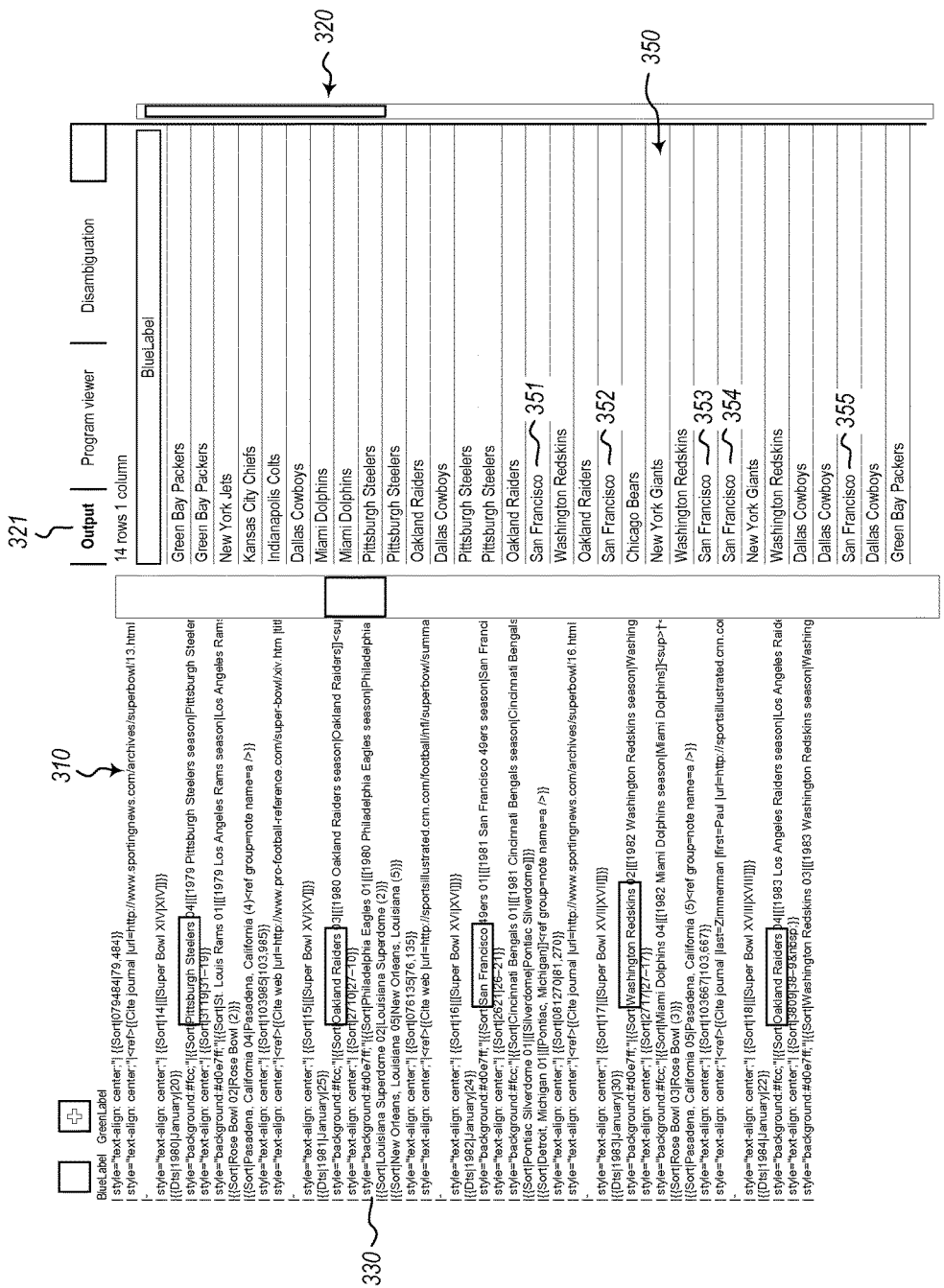

FIG. 3D illustrates in the second interface portion an updated output 350, which may correspond to the updated output 246, that results when the one of the sub-expressions 341-345 is selected that causes an updated generated program to output the winners of all the Super Bowls. Accordingly, the output 350 shows all the Super Bowl winners. In addition, the winners of each of the Super Bowls is highlighted in the data 330 displayed in the first interface portion 210.

Figure 3E:
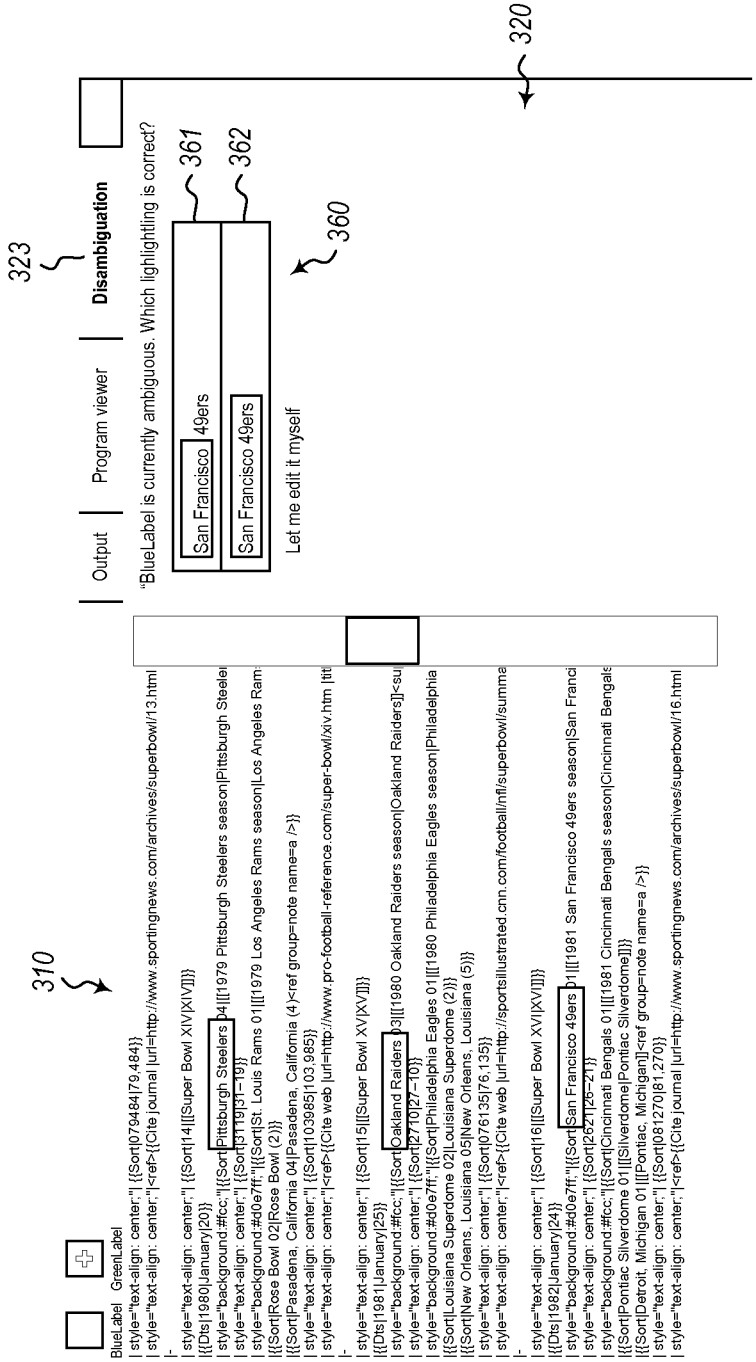

A review of the output 350 shows that for Super Bowl winner San Francisco 49s, only the name of the city is listed and not the mascot name 49s as designated at 351-355 since this mascot name is in numerical form. For all other winning teams, both the city and mascot name are included. This is an example of an ambiguity where the PBE computing system 200 does not know if a numerical name should be included. Accordingly, FIG. 3E shows that the disambiguation tab 323 displays in the second interface portion 320 a question 360 that corresponds to the question 285. As illustrated the question 360 asks whether the output should be San Francisco 361 or San Francisco 49s 362. In this case, since the user 205 desires that both the full name of the team be listed, San Francisco 49s 362 would be selected.

Figure 3F:
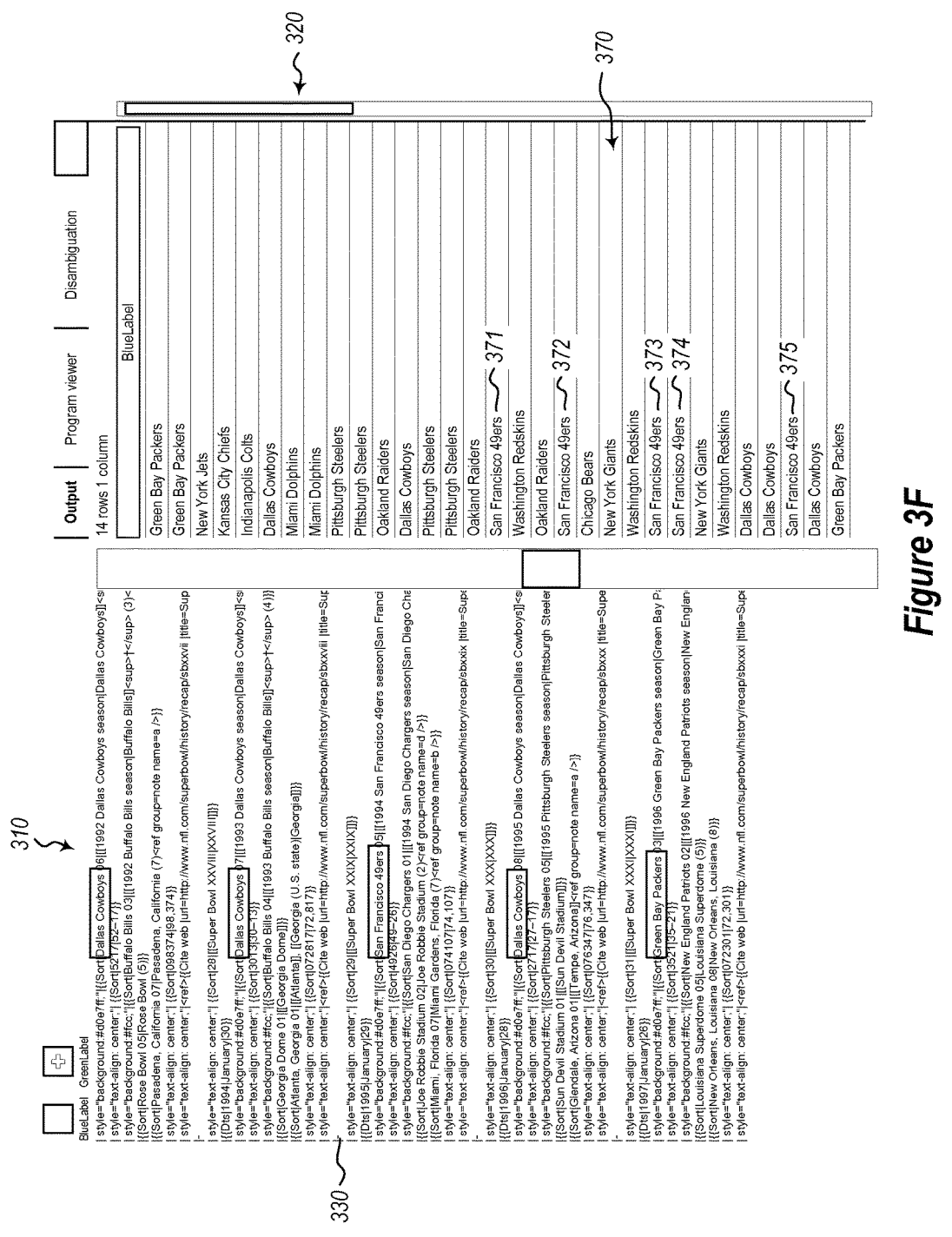

FIG. 3F illustrates the final output 370. As shown in the second interface portion 220, all the winning teams are listed. In addition, San Francisco 49s are also listed correctly as designated at 371-375. Further, the full name of all the winning teams including the San Francisco 49s are highlighted in the data 330 displayed in the first interface portion 210.

FIGS. 4A-4F illustrate an example of using the UI 300 associated with the PBE computing system 200. For ease of explanation, only some portions of the UI 300 will be shown in FIGS. 4A-4F. Consider the task of extracting the set of individual authors from a Bibliography section 410 of a paper entitled "A Formally-Verified C State Analyzer" as shown in FIG. 4A.

First, the user 205 provides an example of an outer region containing each publication record. This may be done by the user 205 highlighting or otherwise specifying two of the publications records in the Bibliography section 410. After providing the two examples, a program is generated and other records are highlighted. However, as seen in FIG. 4B an unexpected gap 420 is present between two extracted regions 421 and 422. The gap 420 is unexpected because the information in the gap, "Springer, 2014.", should be part of the extracted region 421 since it is part of that publication record. Thus, the generated program has not returned a result that is consistent with the user's determined or intended result. Having the user 205 give another example to also include the text "Springer, 2014." fixes the problem and a correct program is generated.

User 205 now wants to extract the list of authors and provides an example inside the first record, which may be accomplished by highlighting the listed authors shown in extracted regions of FIG. 4B. The user 205 observes that the generated program is behaving incorrectly as shown in FIG. 4C. For example, the extracted region 431 shows the authors as being extracted as illustrated by the dashed lines. However, the extracted regions 432 and 433 both show portions of the title in addition to the authors as being extracted as illustrated by the dashed lines. Accordingly, the program has not correctly extracted only the list of authors as desired by the user 205.

At this point, the user 205 opens the program viewer tab 322, and selects a correct alternative for the wrong subexpression as shown in FIG. 4D. The top-ranked program for extracting the Author list from a Record is "extract the substring starting at first occurrence of end of whitespace and ending at the first occurrence of end of Camel Case in the second line". The sub-expression for the starting position seems correct but the sub-expression for the ending position seems too specific for the given example, and the user 205 can view the alternative sub-expressions that the PBE computing system 200 has learned for the end position. Hovering over each alternative sub-expression previews the extraction results in the first interface portion 310. In this case, the user 205 hovers over the first alternative sub-expression 440, which generates the correct result. The final learned program turns out to be "extract everything between first whitespace and first occurrence of Dot after CamelCase."

Now the user 205 wants to extract each author individually, and provides two examples within the first publication record. The PBE computing system 200 identifies all authors correctly. The user 205 can still open the conversational clarification tab 323 to gain confidence in the system results by answering clarifying questions such as should the output include "D.C. Wang" 451 or "and D.C Wang" 452 as shown in FIG. 4E. In this case, the user selects "D.C. Wang" 451 (see FIG. 4F), which is what the PBE system thought was more likely. At each iteration, user 205 is asked to choose between several possible highlightings in the unmarked portion of the document. Each choice is then communicated to the PBE computing system 200 and the set of programs is re-learned.

After two iterations of conversational clarification, the PBE computing system 200 converges on the correct program, and the user 205 is confident that the program has returned the determined or intended result. For example, FIG. 4F shows in extraction 461 that only the authors have been selected and that "and" and the publication information have not been extracted. Likewise, in extraction 462 only the author has been selected and the publication information has not been extracted. Accordingly, the user 205 is confident that the generated program has returned the determined or intended result of only extracting the authors.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
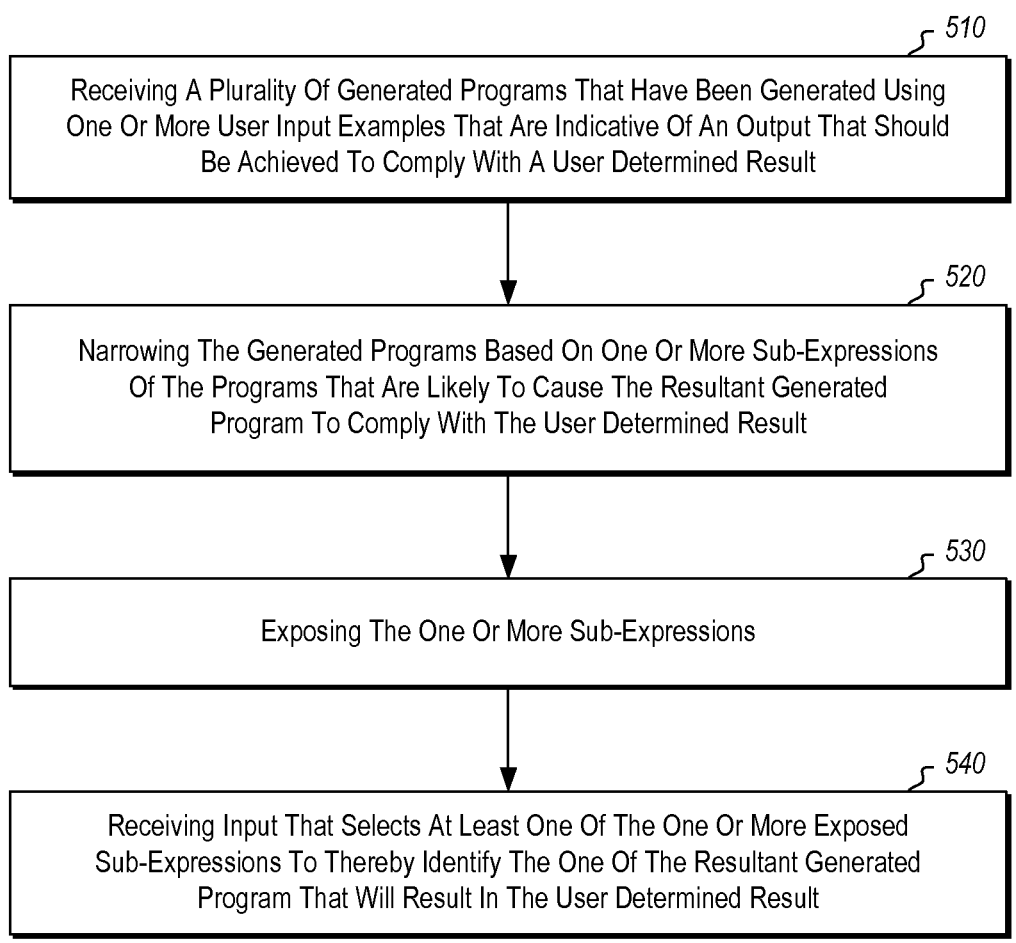
FIG. 5 illustrates a flow chart of an example method for increasing user confidence in results that are produced by one or more programs that are generated by an underlying PBE system based on user input examples.

FIG. 5 illustrates a flow chart of an example method 500 for increasing user confidence in results that are produced by one or more programs that are generated by an underlying PBE system based on user input examples. The method 500 will be described with respect to FIG. 2 described above.

The method 500 includes receiving a plurality of generated programs that have been generated using one or more user input examples that are indicative of an output that should be achieved to comply with a user determined result (act 510). For example, as previously described the ambiguity module 260 receives the generated programs 231, 232, and/or 233 from the program generation module 230. The generated programs are generated based on the user input examples 221, 222, and/or 223 that specify a user determined result.

The method 500 includes narrowing the generated programs based on one or more sub-expressions of the programs that are likely to cause the resultant generated program to comply with the user determined result (act 520) and exposing the one or more sub-expressions (act 530). For example, as previously discussed in one embodiment the program navigation module 280 may generate a list 275 of sub-expressions 276 that are exposed to the user 205. The sub-expressions 276 are those sub-expressions that are likely to cause the generated programs 231, 232, and 233 to comply with the user determined result. The sub-expressions 276 may include at least a partial description in a language that is understandable by the user, is in a computing language, or is an effect the sub-expression in a UI that displays the sub-expressions.

In another embodiment as previously described, the conversational clarification module 280 determines that an ambiguity exists. A question 285 is provided to the user 205 that is configured to resolve the ambiguity in a manner that is consistent with the user determined result.

The method 500 includes receiving input that selects at least one of the one or more exposed sub-expressions to thereby identify the resultant generated programs that will result in the user determined result (act 540). For example, the selection module 290 receives input that selects the sub-expression. In some embodiments, the selection includes highlighting, hovering over, clicking on, or otherwise using an interface pointer or like element to select the sub-expression. In other embodiments, the user input may be an answer to the question 285.

Figure 6:
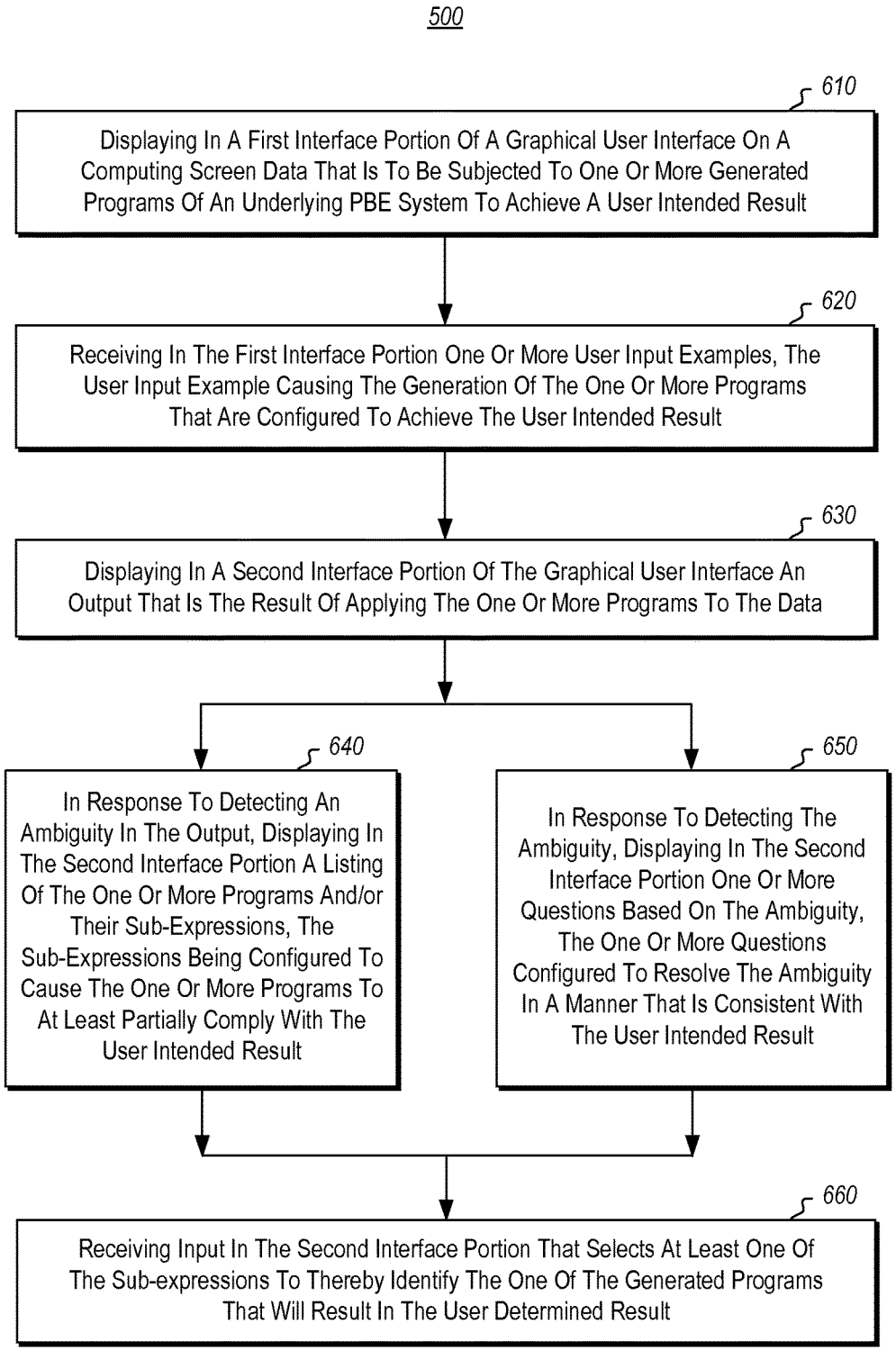
FIG. 6 illustrates a flow chart of an alternative method for increasing user confidence in results that are produced by one or more programs that are generated by an underlying PBE system based on user input examples.

FIG. 6 illustrates a flow chart of an example method 600 for increasing user confidence in results that are produced by one or more programs that are generated by an underlying PBE system based on user input examples. The method 600 will be described with the respect to FIGS. 2 and 3A-3F described above.

The method 600 includes displaying in a first interface portion of a graphical user interface on a computing screen data that is to be subjected to one or more generated programs of an underlying PBE system to achieve a user intended result (act 610). For example, the UI 300 may include the first interface portion 310. Data 330, which may include semi-structured textual data, may be displayed in the first interface portion 310. As previously described, the data 330 is to be subjected to the generated programs such as generated programs 231, 232, and/or 233 of the PBE computing system 200.

The method 600 includes receiving in the first interface portion one or more user input examples, the user input example causing the generation of the one or more programs that are configured to achieve the user intended result (act 620). As previously described, the user 205 may highlight portions of the data 330 in the first interface portion 310. The highlighted portions function as user input examples since they specify the users intended result for the output. The PBE computing system 200 generates the generated programs 231, 232, and/or 233 based on the user input examples.

The method 600 includes displaying in a second interface portion of the graphical user interface an output that is the result of applying the one or more programs to the data (act 630). For example, the UI 300 includes the second interface portion 320 that displays the output 335.

The method 600 includes, in response to detecting an ambiguity in the output, displaying in the second interface portion a listing of the one or more programs and/or their sub-expressions, the sub-expressions being configured to cause the one or more programs to at least partially comply with the user intended result (act 640). For example, as previously described the sub-expressions 341-345 may be displayed in the second interface portion 320. The sub-expressions 341-345 may be described in a language understandable by the user 205 or in a programming language. The sub-expressions may also specify the effect that selecting a given one of the sub-expressions will have on the output.

Alternatively, the method 600 includes, in response to detecting the ambiguity, displaying in the second interface portion one or more questions based on the ambiguity, the one or more questions configured to resolve the ambiguity in a manner that is consistent with the user intended result (act 650). For example, as previously discussed, the question 360 may be displayed in the second interface portion 320. The question 360 is designed to resolve the ambiguity in a manner that is consistent with the user intended result.

The method 600 also includes receiving input in the second interface portion that selects at least one of the sub-expressions to thereby identify the one of the generated programs that will result in the user determined result (act 660). For example, as previously discussed the user 205 is able to select one of the sub-expressions displayed in the second interface portion 320 by clicking on the sub-expressions, hovering over the sub-expression, highlighting the sub-expression, or otherwise using an user interface pointer or element to select the sub-expression.

Alternatively, the user 205 may input the answer to the question 360 in the second interface portion 320 by selecting one of the displayed answers by highlighting the answer or otherwise using an interface element to select the desired answer.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Example Clauses

Example A, a computing system comprising: at least one processor; and at least one storage device having stored computer-executable instructions which, when executed by the at least one processor, implement a method comprising: receiving a plurality of generated programs that have been generated using one or more user input examples that are indicative of an output that should be achieved to comply with a user determined result; narrowing the generated programs based on one or more sub-expressions of the programs that are likely to cause a resultant generated program to comply with the user determined result; exposing the one or more sub-expressions; and receiving input that selects at least one of the one or more exposed sub-expressions to thereby identify the resultant generated program that will result in the user determined result.

Example B, the system as example A recites, wherein the method further comprises: displaying as an output the user determined result that has been obtained using the identified resultant generated program.

Example C, the system as example A recites, wherein narrowing the generated programs and exposing the one or more sub-expressions comprises: generating a list of the sub-expressions; generating at least a partial description for each of the sub-expressions in the list; and displaying the at least partial description to the user as part of the list.

Example D, the system as example C recites, wherein the partial description of each of the sub-expressions includes a description in a language that is understandable by the user.

Example E, the system as example C recites, wherein the partial description of each of the sub-expressions includes a description in a computing language.

Example F, the system as example C recites, wherein the partial description of each of the sub-expressions includes a description of an effect of the sub-expression in a User Interface that displays the sub-expressions.

Example G, the system as example C recites, wherein the list of sub-expressions is ordered by a ranking function.

Example H, the system as example A recites, wherein narrowing the generated programs and exposing the one or more sub-expressions comprises: determining an ambiguity; and asking the user one or more questions based on the ambiguity, the one or more questions configured to resolve the ambiguity in a manner that is consistent with the user determined result.

Example I, the system as example H recites, wherein receiving input that selects at least one of the one or more exposed sub-expressions comprises: receiving an answer to the one or more questions, the answer configured to at least partially identify the one of the generated programs that will result in the user determined result.

Example J, a computer implemented process for increasing user confidence in results that are produced by one or more programs that are generated by an underlying Programming-By-Example (PBE) system based on user input examples, the process comprising: displaying in a first interface portion of a graphical user interface on a computing screen data that is to be subjected to one or more generated programs of an underlying PBE system to achieve a user intended result; receiving in the first interface portion one or more user input examples, the user input example causing the generation of the one or more programs that are configured to achieve the user intended result; displaying in a second interface portion of the graphical user interface an output that is the result of applying the one or more generated programs to the data; in response to detecting an ambiguity in the output, performing one or more of: displaying in the second interface portion a listing of the one or more programs and/or their sub-expressions, the sub-expressions being configured to cause the one or more programs to at least partially comply with the user intended result; or displaying in the second interface portion one or more questions based on the ambiguity, the one or more questions configured to resolve the ambiguity in a manner that is consistent with the user intended result; and receiving input in the second interface portion that selects at least one of the sub-expressions to thereby identify the one of the generated programs that will result in the user determined result.

Example K, the computer implemented process as example J recites, further comprising: displaying in the second interface portion an updated output that is the result of applying the one or more programs associated with the selected sub-expression to the data.

Example L, the computer implemented process as example J recites, wherein the data is semi-structured text data.

Example M, the computer implemented process as example J recites, wherein receiving input in the second interface portion that selects at least one of the sub-expressions comprises: receiving an answer to the one or more questions.

Example N, the computer implemented process as example J recites, wherein receiving input in the second interface portion that selects at least one of the sub-expressions comprises one or more of using an interface pointer to select the at least one sub-expression, highlighting the at least one sub-expression, or clicking on the at least one sub-expression.

Example O, the computer implemented process as example J recites, wherein the listing of the one or more programs and/or their sub-expressions includes an indication of the number of outputs that will be changed if a given sub-expression of the listing is selected.

Example P, the computer implemented process as example J recites, wherein the effect that a given sub-expression of the listing of the one or more programs and/or their sub-expressions will have on the data in the first interface portion if selected is graphically shown on the data in the first interface portion.

Example Q, the computer implemented process as example J recites, wherein the listing of the one or more programs and/or their sub-expressions is shown in a language that is readable by the user or is shown in computer language.

Example R, a computer program product comprising one or more computer-readable media having thereon computer-executable instructions that are structured such that, when executed by one or more processors of a computing system, configure the computing system to perform a method for increasing user confidence in results that are produced by one or more programs that are generated by an underlying Programming-By-Example (PBE) system based on user input examples, the method comprising: receiving a plurality of generated programs that have been generated using one or more user input examples that are indicative of an output that should be achieved to comply with a user determined result; narrowing the generated programs based on one or more sub-expressions of the programs that are likely to cause a resultant generated program to comply with the user determined result; exposing the one or more sub-expressions; and receiving input that selects at least one of the one or more exposed sub-expressions to thereby identify the resultant program that will result in the user determined result.

Example S, the computer program product as example R recites, wherein narrowing the generated programs and exposing the one or more sub-expressions comprises: generating a list of the sub-expressions; generating at least a partial description for each of the sub-expressions in the list; and displaying the at least partial description to the user as part of the list.

Example T, the computer program product as example R recites, wherein narrowing the generated programs and exposing the one or more sub-expressions comprises: determining an ambiguity; and asking the user one or more questions based on the ambiguity, the one or more questions configured to resolve the ambiguity in a manner that is consistent with the user determined result.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
at least one processor; and
at least one storage device having stored computer-executable instructions which, when executed by the at least one processor, cause the computing system to perform at least the following:
receive one or more input data comprising at least a set of semi-structured data and one or more examples of a user determined result to be derived from the set of semi-structured data;
ascertain one or more characteristics from the one or more examples of the user determined output;
based on ascertaining the one or more characteristics, receive an initial plurality of generated programs that have been generated, at least in part, by using the one or more ascertained characteristics;
automatically narrow the initial set of generated programs to create a sub-set of generated programs, the sub-set of generated programs being chosen in part based on ranking a likelihood that one or more sub-expressions of the programs will cause a resultant generated program to comply with the user determined result;
expose the one or more sub-expressions of the sub-set of generated programs; and
receive user input that selects at least one of the one or more exposed sub-expressions to thereby identify the resultant generated program that will result in the user determined result.

2. The computing system of claim 1, at least one storage device also having stored computer-executable instructions which, when executed by the at least one processor, cause the computing system to perform at least the following:
display as an output the user determined result that has been obtained using the identified resultant generated program.

3. The computing system of claim 1, wherein narrowing the generated programs and exposing the one or more sub-expressions comprises:
generating a list of the sub-expressions;
generating at least a partial description for each of the sub-expressions in the list; and
displaying the at least partial description to the user as part of the list.

4. The computing system of claim 3, wherein the partial description of each of the sub-expressions includes a description in a language that is understandable by the user.

5. The computing system of claim 3, wherein the partial description of each of the sub-expressions includes a description in a computing language.

6. The computing system of claim 3, wherein the partial description of each of the sub-expressions includes a description of an effect of the sub-expression in a User Interface that displays the sub-expressions.

7. The computing system of claim 1, wherein narrowing the generated programs and exposing the one or more sub-expressions comprises:
determining an ambiguity; and
asking the user one or more questions based on the ambiguity, the one or more questions configured to resolve the ambiguity in a manner that is consistent with the user determined result.

8. The computing system of claim 7, wherein receiving input that selects at least one of the one or more exposed sub-expressions comprises:
    receiving an answer to the one or more questions, the answer configured to at least partially identify the one of the generated programs that will result in the user determined result.

9. A computer implemented process for increasing user confidence in results that are produced by one or more programs that are generated by an underlying Programming-By-Example (PBE) system based on user input examples, the process comprising:
    displaying a set of semi-structured data in a first interface portion of a graphical user interface on a computing screen;
    receiving, in the first interface portion, one or more user input examples, the user input examples being applied to a portion of the semi-structured data and representing a user intended result to be derived from the set of semi-structured data by subjecting the semi-structure data to one or more generated programs that are configured to achieve the user intended result;
    ascertaining one or more characteristics from the one or more examples of the user intended result;
    based on ascertaining the one or more characteristics, generating an initial plurality of programs that have been generated in part by using the one or more ascertained characteristics
    displaying in a second interface portion of the graphical user interface an output that is the result of applying at least one of the one or more generated programs to the semi-structured data;
    in response to detecting an ambiguity in the output, performing one or more of:
        displaying in the second interface portion a listing of the one or more programs and/or their sub-expressions, the sub-expressions being configured to cause the one or more programs to at least partially comply with the user intended result; or
        displaying in the second interface portion one or more questions based on the ambiguity, the one or more questions configured to resolve the ambiguity in a manner that is consistent with the user intended result; and
    receiving input in the second interface portion that selects at least one of the sub-expressions to thereby identify the one of the generated programs that will result in the user determined result.

10. The computer implemented process of claim 9, further comprising:
    displaying in the second interface portion an updated output that is the result of applying the one or more programs associated with the selected sub-expression to the data.

11. The computer implemented process of claim 9, wherein receiving input in the second interface portion that selects at least one of the sub-expressions comprises:
    receiving an answer to the one or more questions.

12. The computer implemented process of claim 9, wherein receiving input in the second interface portion that selects at least one of the sub-expressions comprises one or more of using an interface pointer to select the at least one sub-expression, highlighting the at least one sub-expression, or clicking on the at least one sub-expression.

13. The computer implemented process of claim 9, wherein the listing of the one or more programs and/or their sub-expressions includes an indication of the number of outputs that will be changed if a given sub-expression of the listing is selected.

14. The computer implemented process of claim 9, wherein the effect that a given sub-expression of the listing of the one or more programs and/or their sub-expressions will have on the data in the first interface portion if selected is graphically shown on the data in the first interface portion.

15. The computer implemented process of claim 9, wherein the listing of the one or more programs and/or their sub-expressions is shown in a language that is readable by the user or is shown in computer language.

16. A computer program product comprising one or more computer-readable hardware storage devices having thereon computer-executable instructions that are structured such that, when executed by one or more processors of a computing system, configure the computing system to perform a method for increasing user confidence in results that are produced by one or more programs that are generated by an underlying Programming-By-Example (PBE) system based on user input examples, the method comprising:
    receiving one or more input data comprising at least a set of semi-structured data and one or more examples of a user determined result to be derived from the set of semi-structured data;
    ascertaining one or more characteristics from the one or more examples of the user determined output based on ascertaining the one or more characteristics, receiving an initial plurality of generated programs that have been generated in part by using the one or more user ascertained characteristics;
    automatically narrowing the initial set of generated programs to create a sub-set of generated programs, the sub-set of generated programs being chosen in part based on ranking a likelihood that one or more sub-expressions of the programs will cause a resultant generated program to comply with the user determined result;
    exposing the one or more sub-expressions of the sub-set of generated programs to the user; and
    receiving input from the user selecting at least one of the one or more exposed sub-expressions to thereby identify the resultant program that will result in the user determined result.

17. The computer program product of claim 16, wherein narrowing the generated programs and exposing the one or more sub-expressions comprises:
    generating a list of the sub-expressions;
    generating at least a partial description for each of the sub-expressions in the list; and
    displaying the at least partial description to the user as part of the list.

18. The computer program product of claim 16, wherein narrowing the generated programs and exposing the one or more sub-expressions comprises:
    determining an ambiguity; and
    asking the user one or more questions based on the ambiguity, the one or more questions configured to resolve the ambiguity in a manner that is consistent with the user determined result.

* * * * *